(No Model.)

G. H. COATES.
FLEXIBLE SHAFT.

No. 578,724. Patented Mar. 16, 1897.

Witnesses
A. L. Whiting
Lena Keeter

Inventor
George H. Coates
By his Attorney
Rufus B. Fowler

UNITED STATES PATENT OFFICE.

GEORGE H. COATES, OF WORCESTER, MASSACHUSETTS.

FLEXIBLE SHAFT.

SPECIFICATION forming part of Letters Patent No. 578,724, dated March 16, 1897.

Application filed February 7, 1896. Serial No. 578,342. (No model.)

*To all whom it may concern:*

Be it known that I, GEORGE H. COATES, a citizen of the United States, residing at Worcester, in the county of Worcester and State of Massachusetts, have invented a new and useful Improvement in Flexible Shafts, of which the following is a specification, accompanied by drawings forming a part of the same and representing such portions of a flexible shaft as are necessary to illustrate the character of my invention.

Figure 1:
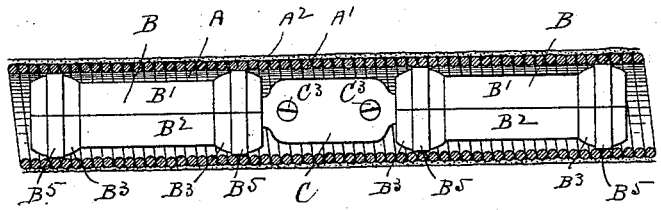
Figure 2:
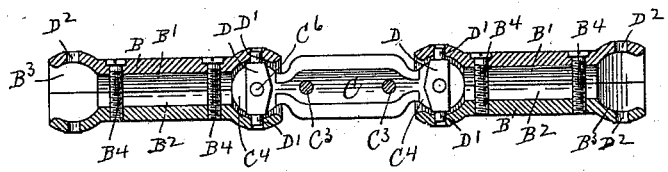
Figure 3:
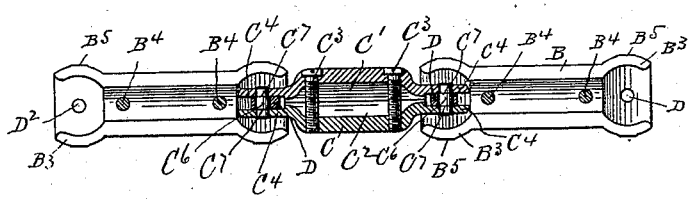
Figure 4:
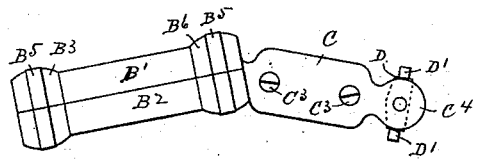
Figure 5:
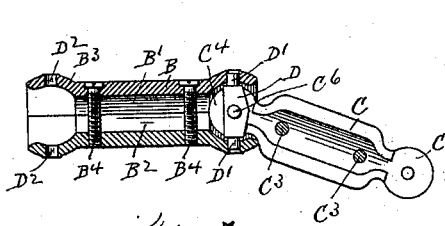
Figure 6:
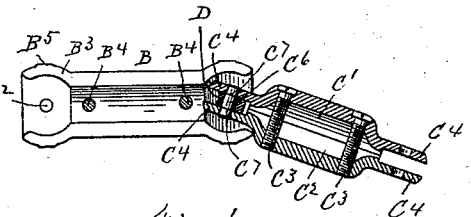

Figure 1 represents a side view of a short section of a flexible shaft with the outer flexible tube shown in central sectional view. Fig. 2 represents a section of a flexible shaft comprising three links removed from the outer covering or flexible tube and represented in central longitudinal sectional view. Fig. 3 represents the same parts as are shown in Fig. 2 and in central longitudinal sectional view, but with the plane of the section at right angles to that represented in Fig. 2. Fig. 4 is a side view of two links of the flexible shaft removed from the outer tube or covering. Fig. 5 is a central longitudinal view of the links represented in elevation in Fig. 4; and Fig. 6 represents the same parts as are shown in Figs. 4 and 5 and in central longitudinal sectional view, but with the plane of section of each link at right angles with the section represented in Fig. 5.

Similar letters refer to similar parts in the different figures.

My present invention relates to that class of flexible shafts employed with dental engines and for similar purposes and consisting of a series of united links inclosed in a flexible tube or covering; and it consists in the several features of construction and arrangement of parts, as hereinafter described, and set forth in the annexed claims.

Referring to the drawings, Fig. 1 represents a short section of a flexible shaft embodying my invention and comprising three links inclosed in a flexible tube or covering and with the flexible tube shown in central sectional view.

A denotes the flexible tube inclosing the links of which the shaft is composed and consisting of a closely-wound spiral spring $A'$, covered with a textile fabric or other flexible material $A^2$. Within the flexible tube A are inclosed the links of the shaft, three of which are represented in the short section of the shaft shown in Fig. 1. The links are of two kinds. The first, which I term a "barrel-link," is denoted in Fig. 1 by the letter B, and the second, which I term an "intermediate" link, connecting the barrel-links B, is represented at C, Fig. 1. The barrel-links B consist of a cylindrical shell made in halves $B'$ $B^2$, with each end enlarged to form a semispherical shell $B^3$. The halves $B'$ $B^2$ are united together either by rivets or by screws $B^4$, as represented in sectional view in Figs. 2 and 5.

The enlarged ends of the barrel-links B are preferably provided with a slightly-raised rib $B^5$ to form a bearing-surface in contact with the inner side of the flexible tube A. The intermediate links C are also formed in halves $C'$ and $C^2$, united together by rivets or by screws $C^3$, as shown in Figs. 3 and 6. Projecting from each end of the halves $C'$ $C^2$ are circular lugs $C^4$, each of which is provided with a concentric hole $C^5$ to receive a pivotal pin $C^6$, which is provided with shoulders $C^7$ $C^7$, bearing against the inner side of the lugs $C^4$ and having the ends of the pin headed so as to unite the lugs $C^4$ $C^4$ together. Pivoted on the pin $C^5$ is a rocking bar D, provided with gudgeons $D'$ $D'$, which enter holes $D^2$ $D^2$ in the enlarged ends of the barrel-links B. The intermediate links C are capable of a rocking motion about the axes of the pivotal pins $C^6$, and they are also capable of a rocking motion about the axes of the gudgeons $D'$ $D'$, and as the axes of the pivotal pins $C^6$ are at right angles to the axes of the gudgeons $D'$ but in the same plane the pivotal connection between the ends of the intermediate links C and the ends of the barrel-links B forms a universal joint, so the rotary motion of one of the barrel-links B will be communicated to its connected intermediate link when placed at an angle thereto the same as if the two were in a straight line.

The outer bearing-surface of the enlarged ends of the barrel-links holds the links B concentrically within the flexible tube A, and as the cross-section of the link C is less in diameter than the enlarged ends of the links B the links C are held out of contact with the flexible tube A. By riveting the ends of the pivotal end $C^6$ and thus uniting the lugs $C^4$ I increase the strength of the intermediate links and prevent the liability of breakage at the neck or union of the lugs $C^4$ with the body of the links C.

What I claim as my invention, and desire to secure by Letters Patent, is—

1. In a flexible shaft, the combination of a series of links B and intermediate links C, lugs $C^4$ projecting from the ends of said intermediate links, pivotal pins by which said lugs are united, rocking bars pivoted on said pivotal pins, and a series of links alternating with said intermediate links and having their ends pivotally connected with said rocking bars.

2. In a flexible shaft, comprising a series of links, the links C, said links being made in halves C, $C^2$, lugs $C^4$ projecting from the ends of said links, pivotal pins $C^6$ carried by said lugs, rocking bars D pivoted on said pins and alternating links B pivotally connected with said rocking bars, substantially as described.

3. In a flexible shaft, comprising a series of links the links B, said links being made in halves $B'$ $B^2$, and having the enlarged ends $B^3$, and a series of alternating links with their ends entering said enlarged ends $B^3$ of the links B, and pivotally connected therewith, substantially as described.

4. In a flexible shaft, comprising a series of links, the combination of a series of links provided with enlarged ends, as at $B^3$, a series of intermediate links provided at their ends with lugs inclosed in said enlarged ends, bars held by said enlarged ends and passing between said lugs, and pins held in said lugs and serving to retain said bars between said lugs, substantially as described.

Dated the 3d day of February, 1896.

GEORGE H. COATES.

Witnesses:
RUFUS B. FOWLER,
HENRY W. FOWLER.